United States Patent

Gupta

[15] 3,645,631

[45] Feb. 29, 1972

[54] APPARATUS AND METHOD FOR MEASURING THE CARRIER CONCENTRATION OF SEMICONDUCTOR MATERIALS

[72] Inventor: Dinesh C. Gupta, Cambridge, Mass.
[73] Assignee: GTE Sylvania Incorporated
[22] Filed: May 5, 1970
[21] Appl. No.: 34,700

[52] U.S. Cl. ................................................356/136, 356/51
[51] Int. Cl. ..................................G01n 21/46, G01n 21/34
[58] Field of Search ..............324/64, 57 R; 356/36, 51, 134, 356/137; 331/94.5

[56] References Cited

UNITED STATES PATENTS

| | | | |
|---|---|---|---|
| 3,183,359 | 5/1965 | White | 331/94.5 |
| 2,807,976 | 10/1957 | Vossberg | 356/136 |
| 3,323,410 | 6/1967 | Waters | 356/136 |
| 3,402,631 | 9/1968 | Potter | 356/36 |
| 3,518,545 | 6/1970 | Copeland | 324/57 |

*Primary Examiner*—Ronald L. Wibert
*Assistant Examiner*—V. P. McGraw
*Attorney*—Norman J. O'Malley, Elmer J. Nealon and David M. Keay

[57] ABSTRACT

Technique of measuring the free carrier concentration in a silicon specimen by passing a beam of infrared or far infrared energy from a laser through a body of intrinsic germanium to impinge on a surface of the silicon specimen which contacts the germanium at an optically flat interface. The angle of incidence is varied until substantially all of the incident radiation is reflected and detected by a photodetector. This angle of incidence is designated the critical angle and is a measure of the carrier concentration of the silicon specimen.

10 Claims, 6 Drawing Figures

PATENTED FEB 29 1972 3,645,631

INVENTOR
DINESH C. GUPTA

BY David M. Keay

AGENT

INVENTOR
DINESH C. GUPTA

BY David M. Keay

AGENT

APPARATUS AND METHOD FOR MEASURING THE CARRIER CONCENTRATION OF SEMICONDUCTOR MATERIALS

BACKGROUND OF THE INVENTION

This invention relates to measuring electrical characteristics of semiconductor materials. More particularly it is concerned with apparatus and method for measuring the concentration of free carriers in semiconductor materials.

Various techniques have been developed for measuring the concentration of free carriers in semiconductor materials. Some techniques are indirect and do not provide a direct correlation between the measurements which are made and the characteristics to be determined. Others require a probe, or probes, to contact the semiconductor material and may be destructive to the material.

It has been found possible to determine the carrier concentration in degenerate semiconductor material by measuring the wavelength of infrared radiation providing minimum reflection from the surface of a body of semiconductor material. The wavelength which produces the minimum is a measure of the refractive index of the semiconductor material, and the refractive index varies with the carrier concentration. However, this technique detects only large changes in refractive index; and, therefore, is limited to very high carrier concentrations; (greater than $10^{18}$ atoms/cm.$^3$ for N-type silicon). Epitaxially grown semiconductor materials typically have lower carrier concentrations, and changes in the refractive index for these concentrations are very small and not readily measurable by the foregoing technique.

BRIEF SUMMARY OF THE INVENTION

Apparatus and method in accordance with the invention for measuring carrier concentration provide for determining the concentration of free carriers within a specimen of semiconductor material having a carrier concentration within the range of typical epitaxially grown material. A body of material which is optically more dense than the specimen to be measured is supported with a surface thereof in contact with a surface of the specimen at a common interface. Radiant energy from a source is directed to pass through the body, which is transparent to the radiant energy, and impinge on the interface between the body and the specimen. Detecting means are provided for detecting and indicating the amount of radiant energy which is reflected from the interface relative to the amount of radiant energy which is incident on the body. The angle of incidence at which the beam of radiant energy passing through the body impinges on the interface is varied, and the detection means detects the amount of radiant energy reflected from the interface for the various angles of incidence. When the detection means indicates that substantially all of the incident light falling on the specimen is being reflected and substantially none is being absorbed in the specimen, the angle of incidence is measured. The measured angle of incidence, designated the critical angle, is a measure of the carrier concentration of the specimen.

BRIEF DESCRIPTION OF THE DRAWINGS

Additional objects, features, and advantages of apparatus and method in accordance with the invention for measuring the concentration of free carriers in semiconductor materials will be apparent from the following detailed description together with the accompanying drawings wherein.

DETAILED DESCRIPTION OF THE INVENTION

Figure 1:
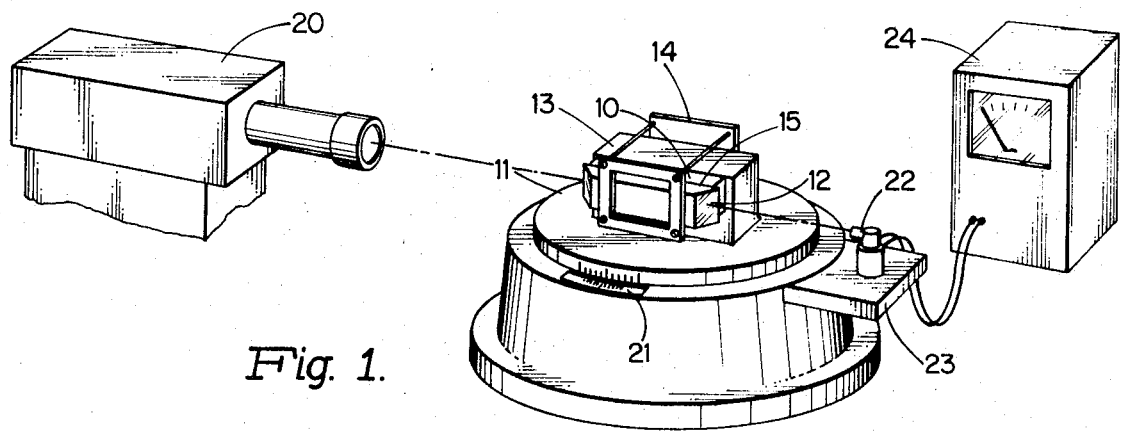
FIG. 1 is a perspective view of apparatus in accordance with the invention for measuring the carrier concentration in specimens of semiconductor material.

As illustrated in FIG. 1 a specimen 10 of a semiconductor material, specifically silicon, is mounted on a spectrometer table 11. At least one surface of the specimen is polished to be optically flat. This surface is positioned vertically at the axis of rotation of the spectrometer table 11. A body 12 of a material which is optically more dense than the silicon 10, specifically intrinsic germanium, is placed in contact with the optically flat surface. (Silicon has a refractive index of approximately 3.4 and germanium has a refractive index of approximately 4.) As illustrated in FIG. 1 the body of intrinsic germanium is a Dove prism having 60° acute angles. The surface of the prism in contact with the specimen is also optically flat. The specimen 10 and the prism 12 are held against a firm backing member 13 also of silicon by a holder 14 to insure that the surfaces of the prism 12 and specimen 10 meet at a planar interface 15 that is optically flat.

A laser 20 is arranged to direct a beam of radiant energy onto the prism 12. The laser 20 produces a parallel beam of monochromatic infrared radiant energy to which the germanium and silicon are both transparent. For example, the laser may be a multimode helium-neon laser operating in the $3S_2$–$3P_4$ transition with emission at 3.39 micrometers. The laser beam is polarized with the plane of polarization parallel to the interface between the silicon specimen and the germanium body.

The polarized radiant energy from the laser 20 is made incident on the prism 12 and it refracts through the prism to impinge on the interface 15 as a narrow parallel beam. The angle of incidence at which the beam impinges on the interface is readily determined from measurements of the angular position of the spectrometer table 11 as read on a scale 21. Radiant energy reflected from the interface passes through the germanium prism 12 and is detected by a photodetector 22 which is sensitive to the radiant energy. The photodetector 22 is mounted on an arm 23 which pivots about the axis of the spectrometer table 11 independently of the table. In response to incident radiant energy the photodetector 22 produces an electrical output which is measured by a DC microvoltmeter 24.

The following is a brief explanation of the manner in which the apparatus as described may be employed to measure the concentration of free carriers in the specimen 10. When radiant energy passes through an optically dense medium, such as the germanium prism, to a less dense medium, such as the silicon specimen, the ratio of the amplitudes of the reflected and incident radiant energy can be expressed as follows:

$$r_p = \frac{\bar{n}_o \cos \phi_1 - \bar{n} \cos \phi_o}{\bar{n}_o \cos \phi_1 + \bar{n} \cos \phi_o} \quad (1)$$

where $r_p$ is the ratio of the amplitudes of the reflected and incident radiant energy $\bar{n}_o$ is the complex refractive index of the dense medium $\bar{n}$ is the complex refractive index of the less dense medium $\phi_o$ is the angle of incidence $\phi_1$ is the angle of refraction.

Figure 3:
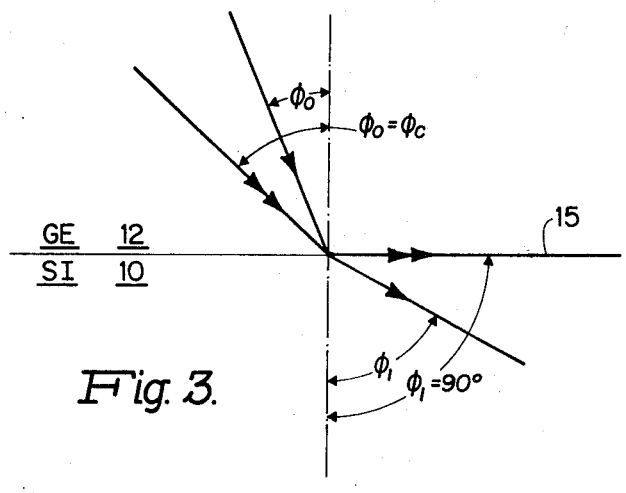
FIG. 3 is a diagram for use in explaining certain optical phenomenon concerned with the invention.

The refractive indices are also related by Snell's Law as follows:

$$\bar{n} \sin \phi_1 = \bar{n}_o \sin \phi_o \quad (2)$$

and as illustrated by the diagram of FIG. 3.

As can be seen by the diagram of FIG. 3 the angle of refraction ($\phi_1$) is greater than the angle of incidence ($\phi_o$). At a certain angle of incidence, designated the critical angle ($\phi_c$), the angle of refraction equals 90° and substantially all of the incident radiant energy is reflected along the interface in accordance with expression (1). The critical angle is related to the refractive index of the material in accordance with expression (2).

The index of refraction of silicon is related to the free carrier concentration in the silicon by the following expression:

$$n^2 = n_i^2 + k^2 - \frac{e^2\lambda^2}{\pi m\epsilon_o C^2}\left(\frac{m}{m^*}\right) N. \qquad (3)$$

where $n$ is the refractive index of the silicon specimen ($\bar{n}$=n—ik)
$n_i$ is the refractive index of intrinsic silicon
$k$ is the extinction coefficient of silicon
$e$ is the electron charge
$\lambda$ is the wave length of the radiant energy
$m$ is the mass of an electron
$\epsilon_o$ is the permittivity of free space
$C$ is the velocity of light in a vacuum
$m^*$ is the free electron effective mass of silicon
$N$ is the free carrier concentration in the silicon specimen.

Thus, the critical angle is a measure of the free carrier concentration in the specimen, and the critical angle is that angle of incidence at which substantially all the incident radiant energy is reflected. The critical angle is measured in the apparatus of FIG. 1 by rotating the spectrometer table 11 to vary the angle of incidence, and by moving the photodetector 22 to a position to measure the reflected radiant energy for each angle of incidence. When subsequent readings from the photodetector 22 indicates that substantially all of the incident radiant energy is being reflected and that for each change in the angle of incidence ($\Delta\phi_o$) there is very little change in the percentage of radiant energy reflected ($\Delta r_p$) the critical angle has been reached.

Figure 4:
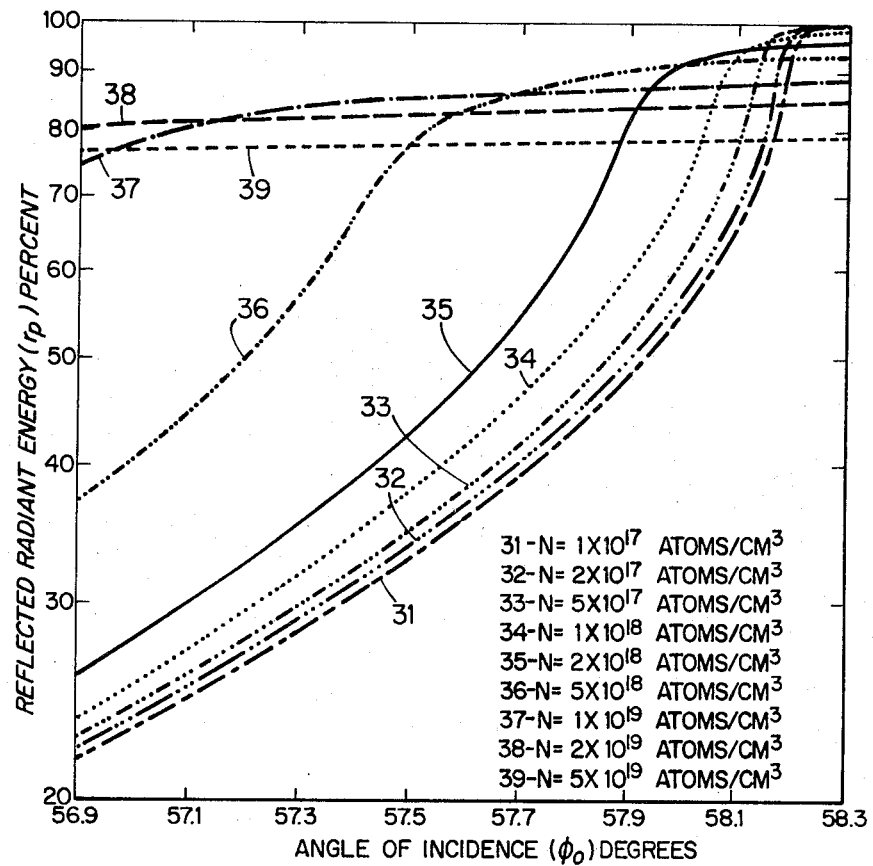
FIG. 4 is a graph of the percentage of incident radiant energy reflected versus the angle of incidence for various specimens of semiconductor material having different carrier concentrations.

FIG. 4 is a graph illustrating the percentage of incident radiant energy reflected ($r_p$) versus the angle of incidence as measured with the apparatus described on several specimens of N-type silicon having different free carrier concentrations. (Curves 31–39.) The radiant energy from the laser 20 had a wavelength of 3.39 micrometers and was polarized in the plane parallel to the interface between the prism and the specimen. It was found that curves of the nature of those shown in FIG. 4 were steeper near the critical angle for radiant energy polarized parallel to rather than perpendicular to the plane of the interface. The critical angle is that angle at which the curve breaks abruptly, that is, where $\Delta r_p/\Delta\phi_o$ becomes small. The curves of FIG. 4 are consolidated into a single curve in FIG. 5 (a portion on an expanded ordinate being shown in FIG. 5A) showing the critical angle versus the free carrier concentration in N-type silicon.

Figure 5:
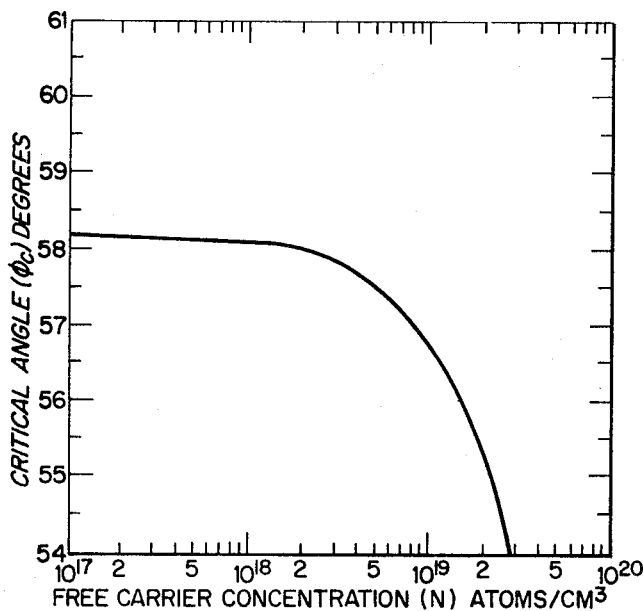
FIG. 5 is a graph of the angle of incidence at which substantially all the incident radiant energy is reflected (the critical angle) versus carrier concentration of the semiconductor material.
Figure 5A:
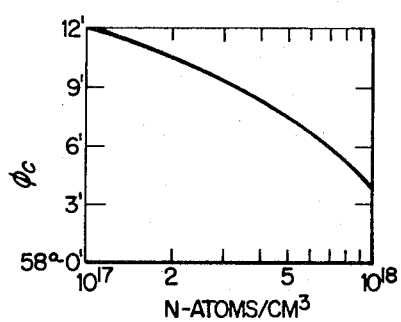
FIG. 5A is a portion of the curve of FIG. 5 with the ordinate expanded.

Although the apparatus as described can be employed to determine the critical angle and thus the carrier concentrations of silicon specimens having concentrations of from $10^{17}$ to $10^{20}$ atoms/cm.$^3$, it is apparent from the curves of FIGS. 4 and 5 that the greatest accuracy is obtained at the lower concentrations. Because of the inverse relationship between the square of the wavelength of the radiant energy ($\lambda$) and the carrier concentration ($n$) (see expression (3)), the range of carrier concentrations which can be measured can be changed by changing the wavelength of the radiant energy. For example, carrier concentrations as low as $10^{16}$ atoms/cm.$^3$ can be measured accurately employing radiant energy having a wavelength of about 10 micrometers, and concentrations as low as $2.5 \times 10^{15}$ atoms/cm.$^3$ with a wavelength of about 20 micrometers. These ranges encompass silicon materials commonly employed in the semiconductor industry.

Figure 2:
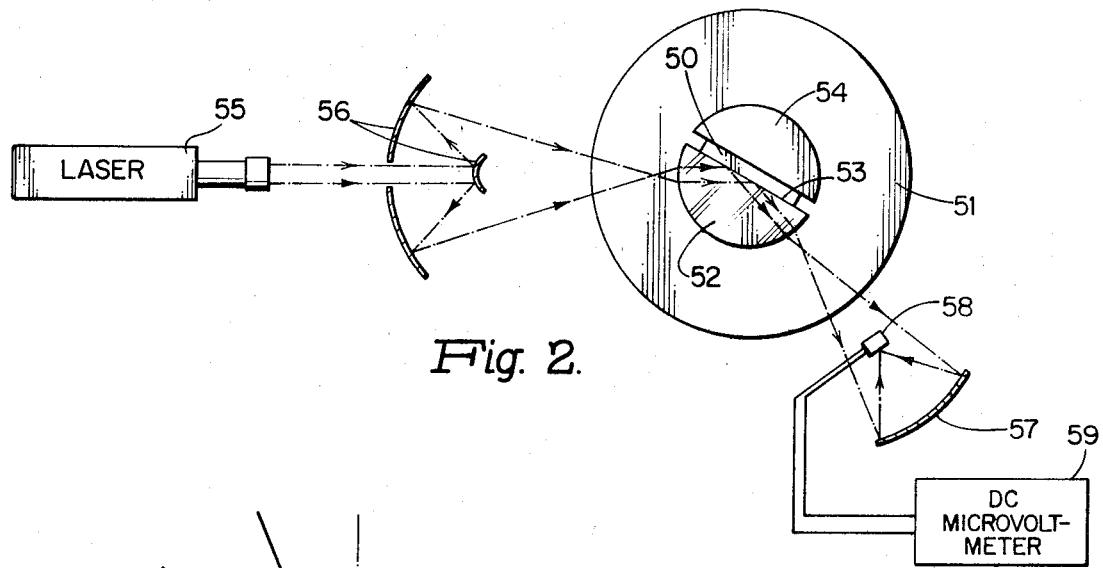
FIG. 2 is a schematic representation of a modification of the apparatus of FIG. 1.

A modification of the apparatus of the invention is illustrated in the schematic representation of FIG. 2. A silicon specimen 50 is mounted on a spectrometer table 51 with an optically flat surface of the specimen in contact with the optically flat planar surface of one-half of a right circular cylinder of intrinsic germanium 52 at a common interface 53. The half cylinder and the specimen 50 are held against a backing member 54 of silicon. A laser 55 serves as a source of plane polarized monochromatic radiant energy. The beam of radiant energy from the laser 55 is reflected by Cassegrein mirrors 56 which focus the beam in a small spot just outside the curved surface of the germanium half cylinder 52.

The radiant energy passes through the germanium half cylinder 52 as a parallel beam and impinges on the interface between the silicon specimen 50 and the germanium half cylinder 52. The reflected radiant energy is reflected by a concave mirror 57 onto a photodetector 58. The electrical output of the photodetector 58 is read on a microvoltmeter 59.

The apparatus and method for measuring the concentration of free carriers in a body of semiconductor material as described hereinabove are particularly useful as applied to epitaxial layers. Since at the critical angle the incident radiant energy reflects at the surface of the specimen, the deeper lying material does not affect the measurement obtained. The disclosed technique permits accurate measurement of the carrier concentrations which are typical of those in epitaxial layers widely used in the semiconductor industry. In addition, the technique does not employ probes which come in contact with the specimen; and, therefore, is not destructive to the specimen.

While there has been shown and described what are considered preferred embodiments of the present invention, it will be obvious to those skilled in the art that various changes and modifications may be made therein without departing from the invention as defined by the appended claims.

What is claimed is:

1. Apparatus for measuring the carrier concentration of a specimen of semiconductor material comprising
    a source of radiant energy;
    a body of a material which is transparent to the radiant energy of the source and which is optically more dense than the specimen of semiconductor material to be measured;
    supporting means for mounting the body with a surface of the body in contact with a surface of the specimen of semiconductor material at a common interface;
    means for directing a beam of radiant energy from said source onto said body so that the radiant energy passes through the body and impinges on the interface between the body and the specimen of semiconductor material;
    detection means for detecting and indicating the amount of radiant energy reflected from the interface relative to the amount of radiant energy incident on said body;
    means for varying the angle of incidence at which the beam of radiant energy passing through the body impinges on the interface; and
    measuring means for measuring the angle of incidence when the detecting means indicates that substantially all the incident radiant energy is being reflected, thereby providing a measure of the carrier concentration of the specimen of semiconductor material.

2. Apparatus for measuring the carrier concentration of a specimen of semiconductor material in accordance with claim 1 wherein
    the surface of the body and the surface of the specimen of semiconductor material which contact at the common interface are both optically flat; and
    the source of radiant energy is a laser.

3. Apparatus for measuring the carrier concentration of a specimen of semiconductor material in accordance with claim 2 including
    means for rotating the body and the specimen of semiconductor material about an axis parallel to the plane of the interface of the body and the specimen of semiconductor material; and
    means for directing the beam of radiant energy in a plane perpendicular to the plane of the interface and perpendicular to the axis.

4. Apparatus for measuring the carrier concentration of a specimen of semiconductor material in accordance with claim 3 wherein the laser includes means for polarizing the beam of radiant energy from the laser in a plane parallel to the plane of the interface.

5. Apparatus for measuring the carrier concentration of a specimen of semiconductor material in accordance with claim 4 wherein
the specimen is of silicon; and
the body is of intrinsic germanium.

6. Apparatus for measuring the carrier concentration of a specimen of semiconductor material in accordance with claim 5 wherein
the body of germanium is one-half of a right circular cylinder having an optically flat planar surface opposite the curved surface for contacting the surface of the specimen of semiconductor material.

7. Apparatus for measuring the carrier concentration of a specimen of semiconductor material in accordance with claim 5 wherein
the body of germanium is a Dove prism.

8. The method of measuring the carrier concentration of a specimen of semiconductor material comprising the steps of
placing a surface of a body of a material which is optically more dense than the specimen of semiconductor material to be measured in contact with a surface of a specimen of semiconductor material;
directing a beam of radiant energy onto said body so that the radiant energy passes through the body and impinges on the interface between the body and the specimen of semiconductor material;
varying the angle of incidence at which the beam of radiant energy passing through the body impinges on the interface, and simultaneously detecting the amount of radiant energy reflected from the interface; and
measuring the angle of incidence when the amount of radiant energy detected indicates that substantially all the incident radiant energy is being reflected, thereby providing a measure of the carrier concentration of the specimen of semiconductor material.

9. The method of measuring the carrier concentration of a specimen of semiconductor material in accordance with claim 8 including
placing an optically flat surface of the body of a material which is optically more dense than the specimen of semiconductor material to be measured in contact with an optically flat surface of the specimen of semiconductor material;
directing a beam of coherent monochromatic radiant energy from a laser onto said body, said beam lying in a plane perpendicular to the interface between the optically flat surface of the body and the specimen of semiconductor material; and
varying the angle of incidence at which the beam of radiant energy impinges on the interface by rotating the body and the specimen of semiconductor material about an axis parallel to the interface and perpendicular to the plane of the beam.

10. The method of measuring the carrier concentration of a specimen of silicon comprising
placing the optically flat planar surface of a half-right circular cylindrically shaped body of intrinsic germanium in contact with an optically flat surface of a specimen of silicon;
directing a beam of plane-polarized coherent monochromatic radiant energy from a laser onto the curved surface of the body of germanium so that the radiant energy passes through the body and impinges on the interface between the body and the specimen, said beam lying in a plane perpendicular to the interface, and the plane of polarization of the radiant energy being parallel to the interface;
varying the angle of incidence at which the beam of radiant energy impinges on the interface by rotating the body and the specimen about an axis parallel to the interface and perpendicular to the plane of the beam, and simultaneously detecting the amount of radiant energy reflected from the interface; and
measuring the angle of incidence when the amount of radiant energy detected indicates that substantially all the incident radiant energy is being reflected, thereby providing a measure of the carrier concentration of the specimen of silicon.

* * * * *